Patent Number: 4,909,590
Date of Patent: Mar. 20, 1990

United States Patent
Kamiko et al.

[54] METHOD AND APPARATUS FOR SWITCHING OPTICAL CONNECTOR

[75] Inventors: Kazuo Kamiko; Shizuka Yamaguchi; Isamu Kinoshita; Koji Sasaki; Kazuhiro Miyazawa; Hisaharu Yanagawa; Mikio Ogai; Yoshiyuki Kamata; Toshihiro Ochiai, all of Ichihara, Japan

[73] Assignee: The Furukawa Electric Co., Ltd., Tokyo, Japan

[21] Appl. No.: 141,797

[22] Filed: Jan. 11, 1988

[30] Foreign Application Priority Data

| Jan. 9, 1987 | [JP] | Japan | 62-1685 |
| Mar. 18, 1987 | [JP] | Japan | 62-61370 |
| Mar. 20, 1987 | [JP] | Japan | 62-64000 |
| Mar. 24, 1987 | [JP] | Japan | 62-67897 |
| Jun. 5, 1987 | [JP] | Japan | 62-139936 |
| Jun. 5, 1987 | [JP] | Japan | 62-139937 |
| Jun. 12, 1987 | [JP] | Japan | 62-146493 |

[51] Int. Cl.⁴ ............................ G02B 6/40
[52] U.S. Cl. .................. 350/96.22; 350/96.20
[58] Field of Search .............. 350/96.20, 96.21, 96.22

Primary Examiner—William L. Sikes
Assistant Examiner—Robert E. Wise
Attorney, Agent, or Firm—Foley & Lardner, Schwartz, Jeffery, Schwaab, Mack, Blumenthal & Evans

[57] ABSTRACT

A method for switching an optical connector having paired optical connectors, having pins engaged with engaging holes of the optical connectors, which involves a connector disposing step of disposing the switching optical connector parallel to the separating optical connector, a pin forward moving step of moving the pins engaged with both the reconnecting and separating optical connectors each other to the reconnecting optical connector side, then a connecting switching step of relatively moving the reconnecting optical connector, the separating optical connector and the switching optical connector and the front end faces thereof, and finally pin backward moving step of moving the pins of the reconnecting optical connector side to the switching optical connector side. Thus, the method and an apparatus for switching an optical connector can momentarily switch to connect optical transmission units with optical connectors without depending upon a worker's skill as well as to mechanize or automate the replacing work.

8 Claims, 7 Drawing Sheets

METHOD AND APPARATUS FOR SWITCHING OPTICAL CONNECTOR

BACKGROUND OF THE INVENTION

The present invention relates to a method and apparatus for switching an optical connector and, more particular, to a method and apparatus for momentarily switching the optical connector.

Optical connectors are used when connecting optical transmission units which mainly contain optical fibers with reproducibility known per se.

Optical connectors made of plastic or metal attached integrally to the end of the optical transmission unit are generally employed as one of the optical connectors, which has centering engaging holes at both sides.

When the optical transmission units are connected to each other through such optical connectors, the front end faces of paired optical connectors are opposed to each other, and pins may be engaged with the engaging holes coincident to each other in the opposed state.

In an optical communication system, defects, alterations of connections or transfers of ray lines (optical communication cable) happen at a considerable rate of occurrence. A partial zone or an entire zone of the existing ray line is replaced by a new optical line at every time. Thus, the connecting works of the existing ray line must be executed at every time.

In this case, the optical transmission units for forming the ray lines are separated at the connection unit with the above-mentioned optical connectors, and the optical transmission units are again connected through the optical fibers.

When replacing the optical cable with the existing ray line of the active line state composed of the optical cables, it is requested to switch and connect the optical transmission units without disturbance in the transmission of existing information (optical signals).

For example, in order to suppress the interrupting time of an optical signal to 40 msec. or shorter of the maximum allowable time, it is necessary to complete the switching work with the optical connectors in an extremely short time within the allowable time.

However, it is common to connect optical transmission units through optical connectors or separate the optical transmission units at the connection units of the optical connectors depending upon the worker's skill. Even skillful worker ordinarily takes several seconds when disassembling the optical connectors of the connected state and then reconnecting the disassembled optical connector with an optical connector prepared separately. Information (optical signals) is interrupted in the existing ray line during the period.

The switching of the optical connectors is described as being mechanized or automated so as to shorten the replacing work, but a desirable method and apparatus for replacing the optical transmission units has not yet been provided at the present.

SUMMARY OF THE INVENTION

Accordingly, an object of the present invention is to provide a method and an apparatus for switching an optical connector which can eliminate the above-mentioned drawbacks and can momentarily switch to connect optical transmission units with optical connectors without depending upon a worker's skill as well as to mechanize or automate the replacing work.

In order to achieve the above and other objects, there is provided according to the present invention a method for switching an optical connector having paired optical connectors opposed at front end faces thereof, pins engaged with engaging holes penetrating linearly longitudinally at the optical connectors to connect both the optical connectors to each other in such a manner that one of the optical connectors in a connected state is for reconnecting and the other is for separating so that the reconnecting optical connector is connected to the switching optical connector having an engaging hole prepared separately. The method includes a connector disposing step of disposing the switching optical connector in parallel with the separating optical connector, a pin forward moving step of moving the pins engaged with both the reconnecting and separating optical connectors from each other to the reconnecting optical connector side by means of a pushing rod inserted from the rear end face of the separating optical connector into the engaging hole in order to remove the pins from the separating optical connector, which is to be executed in an arbitrary sequence. This is followed by a connecting switching step for relatively moving the reconnecting optical connector, the separating optical connector and the switching optical connector along the front end faces thereof in order to separate the separating optical connector from the reconnecting optical connector and simultaneously bringing the front end face of the reconnecting optical connector and the front end face of the switching optical connector in coincidence with each other. Finally, a pin backward moving step is provided for moving the pins of the reconnecting optical connector side to the switching optical connector side by means of a pushing rod disposed at the rear end face side of the reconnecting optical connector in order to engage the pins with the engaging holes of the switching optical connector to dispose the pins over the reconnecting optical connector and the separating optical connector.

According to another aspect of the present invention, there is also provided an apparatus for switching an optical connector having paired optical connectors opposed at front end faces thereof, pins engaged with engaging holes penetrating linearly longitudinally at the optical connectors to connect both the optical connectors to each other in such a manner that one of the optical connectors in a connected state is used for reconnecting and the other is used for separating, so that the reconnecting optical connector is connected to the switching optical connector having an engaging hole prepared separately and comprising a main base for holding the reconnecting optical connector, a subbase for holding the separating optical connector and the switching optical connector in parallel, the main and subbases being disposed relatively movable in such a manner that the front end faces thereof are opposed to each other, the pin pushing rods engaged within the engaging holes of the optical connectors and pushing rod operating means provided on the main and subbases, whereby at least one of the main and subbases has moving means for relatively moving the main or subbase in a desired direction.

In the method for switching the optical connector of the present invention, the optical connectors are replaced momentarily by less and simple steps without any waste in the work, such as the connector disposing step, pin forward moving step, connector switching step and the pin backward moving step. Thus, the optical signal interrupting time can be extremely shortened in the replacement of the optical connector in the existing ray line of the active line state.

In case of the apparatus for switching the optical connector of the invention, since the apparatus comprises the main base for holding the reconnecting optical connector, the subbase for holding the separating optical connector and the switching optical connector, the pin pushing rods engaged in the engaging holes of the optical connectors, pushing rod operating means and moving means for moving the main base and the subbase relatively in a desired direction, the steps of the above-mentioned optical connector switching method can be mechanically automated to establish the automation of the method for switching the optical connector.

The above and other related objects and features of the invention will be apparent from a reading of the following description of the disclosure found in the accompanying drawings and the novelty thereof pointed out in the appended claims.

DETAILED DESCRIPTION OF THE PREFERRED EMBODIMENTS

Embodiments of a method and an apparatus for switching an optical connector according to the present invention will be described in detail with reference to the accompanying drawings.

Figure 1:
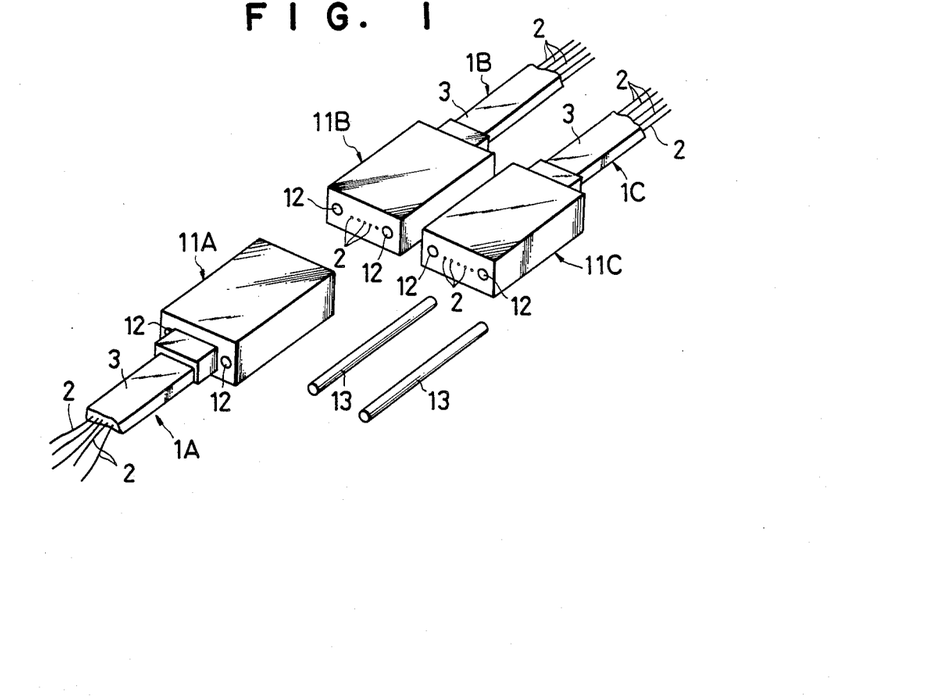
FIG. 1 is a perspective view of an optical connector handled in a method and apparatus for switching the optical connector according to the present invention.

In FIG. 1, multicore coated optical transmission units 1A, 1B, 1C, each having a flat rectangular sectional shape, are formed of a plurality of optical fibers 2 integrally coated through a coating layer 3.

The coated optical transmission units 1A, 1B, 1C each becomes the constituent unit of an optical cable unit, which, in turn, becomes a constituent unit of an optical cable., which is used as a ray line.

In FIG. 1, optical connectors 11A, 11B, 11C are formed of plastic or metal, and each are formed at both sides with engaging holes 12 which penetrate longitudinally with the optical connector.

Such optical connectors 11A, 11B, 11C are respectively integrally attached to the ends of the coated optical transmission units 1A, 1B, 1C, and the optical fibers 2 are exposed at the end faces in the same plane as the front end faces of the optical fibers 2 at the front end faces of the optical connectors 11A, 11B, 11C.

The above-mentioned optical connectors 11A, 11B, 11C might also be attached to the ends of a plurality of single core coated optical transmission units aligned in parallel with each other.

In FIG. 1, pins 13 are members for connecting either of the two above-mentioned optical connectors 11A, 11B, 11C.

Each pin 13 has an outer diameter relatively engaged precisely with the engaging hole 12 of each of the optical connectors 11A, 11B, 11C and a length over the engaging holes 12 of both optical fibers opposed to each other.

FIGS. 2(a) through 2(e) sequentially show the steps of an embodiment of a method for switching an optical connector according to this invention.

Figures 2A, 2B, 2C, 2D, 2E:
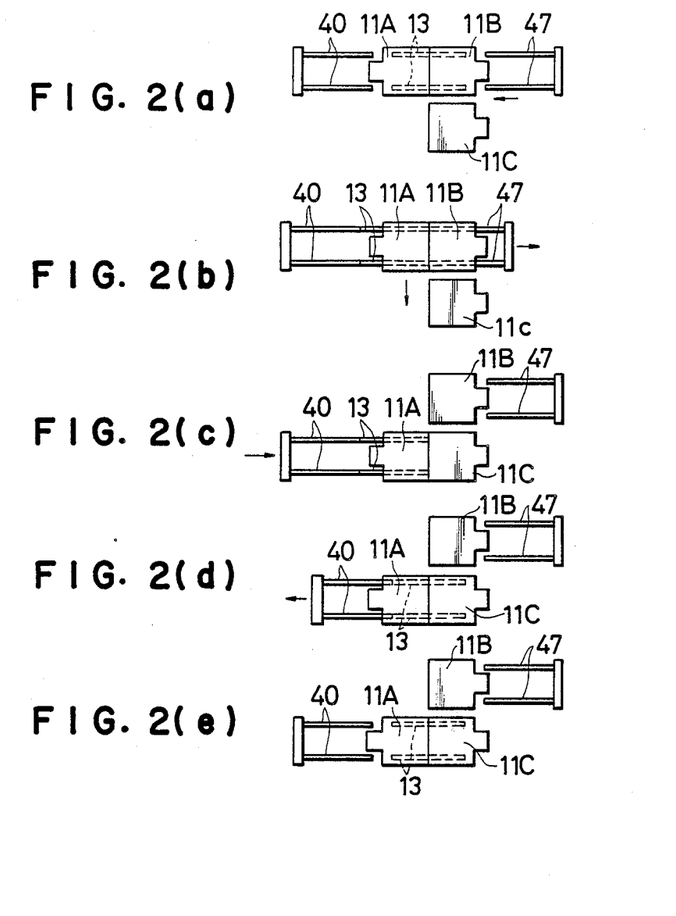
FIG. 2(a) through 2(e) are sequential explanatory views showing the steps of a first embodiment of a method for switching an optical connector according to the present invention.

In the case of FIG. 2(a), paired optical connectors 11A and 11B are opposed at the front end faces, the pins 13 are engaged into two engaging holes 12 coincident in the opposed state to connect both the optical connectors 11A and 11B to each other.

Optical connector 11A of the above-mentioned connecting state is for reconnecting, and 11B is for separating. The optical connector 11A for reconnecting is switched to be connected with a switching optical connector 11C prepared separately.

Thus, as shown in FIG. 2(a), the switching optical connector 11C is disposed in parallel with the corresponding optical connector 11B at the side of the optical connector 11B for separating.

In FIG. 2(a), when a pin pushing rod 47 disposed at the side of the rear end face of the separating optical connector 11B is initially moved forward toward the optical connector 11B, the pin pushing rod 47 enters the engaging hole 12 of the separating optical connector 11B as shown in FIG. 2(b) in order to move the pin 13 to the reconnecting optical connector 11A side and to remove the pin 13 from the separating optical connector 11B.

Then, as shown in FIG. 2(c), when the reconnecting optical connector 11A is moved in a predetermined distance to the switching optical connector 11C side along the end face thereof, the reconnecting optical connector 11A and the separating optical connector 11B are separated from each other, and the front ends of the reconnecting optical connector 11A and the switching optical connector 11C simultaneously coincide with each other.

The pin pushing rod 47 moves backward in this meantime to return to the original position.

Thereafter, as shown in FIG. 2(d), pin pushing rods 40 disposed at the side of the rear end face of the reconnecting optical connector 11A is moved forward toward the optical connector 11A, and the pin pushing rods 47 thus moved forward are contacted with the pins 13 disposed at the side of the reconnecting optical connector 11A.

After the contacting, the pins 13 are moved through the pin pushing rods 40 to the switching optical connector 11C side to be engaged with the engaging holes 12 of the switching optical connector 11C, and the pins 13 are thus disposed between the reconnecting optical connector 11A and the now separating optical connector 11C, thereby completing the switching of the optical connectors.

Thereafter, as shown in FIG. 2(d), the pin pushing rods 40 are moved backward to be returned to the original positions.

The method of this invention is based on the above-mentioned operations according to predetermined steps. However, the method of this invention may additionally employ other embodiments described below.

One of the other embodiments precedes the step of moving the pin forward in relative relation to the steps of disposing the connectors (in FIG. 2(a)) and the step of moving the pins forward, and following the step of disposing the connectors.

However, as in the sequence disclosed in FIG. 2, it is preferable in the execution without interrupting a series of works to move forward the pins 13 after disposing the separating optical connector 11C at the predetermined position.

Figure 3A:
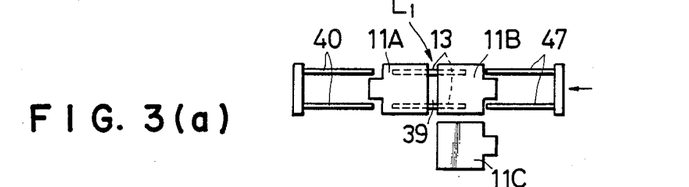
FIGS. 3(a) through 3(d) are explanatory views showing the steps of an essential portion of a second embodiment of a method for switching an optical connector according to the invention.

Another of the embodiments relatively moves one of the reconnecting optical connector 11A, the separating optical connector 11B and the switching optical connector 11C at a small distance in a direction for separating the front end faces thereof as shown in FIG. 3(a) before starting the step of switching and moving the connectors in FIGS. 2(b) and 2(c) so as to set a fine gap $L_1$ between the front end faces of both the connectors.

Such a gap $L_1$ is ordinarily set to 10 to 30% of the stroke of the pin 13.

In this case, in moving the connectors in the later time, there is no possibility that the front end faces of the separating optical connector 11B and the switching optical connector 11C are damaged by the ends of the pins 13 engaged only with the engaging holes 12 of the reconnecting optical connector 11A.

Figure 3B:
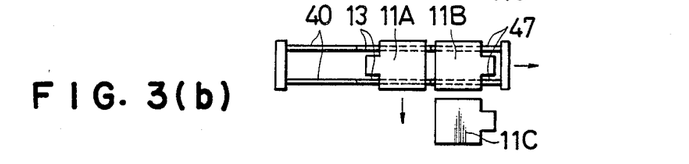
Figure 3C:
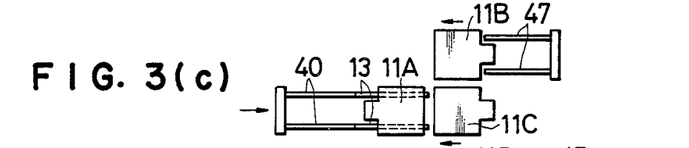
Figure 3D:
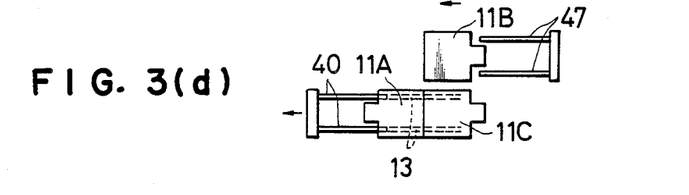

After the fine gap $L_1$ of FIG. 3 (a) is set, the connecting switching work is carried out in the sequence of FIGS. 3(b), 3(c) and 3(d). In FIGS. 3(c) and (d), both the optical connectors 11A and 11C are relatively moved in a predetermined direction so as to oppose the front end faces of the reconnecting optical connector 11A and the switching optical connector 11C so as to eliminate the fine gap $L_1$.

In this operation, when the reconnecting optical connector 11A is fixed and the separating optical connector 11B is moved in a predetermined direction, the switching optical connector 11C is ordinarily moved together with the separating optical connector 11B.

Figure 4:
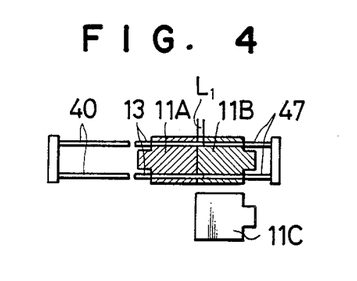
FIGS. 4, 5 and 6 are views showing the steps of an essential portion of other embodiments of a method for switching an optical connector according to the invention.

Yet in another one of the embodiments, before the pins 12 are removed from the separating optical connector 11B in the pin forward moving step in FIGS. 2(a) to 2(b), the pins 13 are temporarily stopped as shown in FIG. 4, and the pins 13 are again moved thereafter to remove the pins 12 from the separating optical connector 11B.

The reason is as will be described.

It is necessary to switch the optical connectors in at least two connection units when a partial zone of the ray line is replaced with a new ray line in the existing ray line.

In this case, assume that one optical connector is initially switched and the other optical connector is then switched, a signal interrupting time at the existing ray line is lengthened. However, when these two optical connectors are simultaneously switched, the signal interrupting time is reduced by half.

Further, when the signal transmitting state is held as long as possible in the simultaneous switching of the optical connectors, and the optical connectors of the connecting units are simultaneously switched, the signal interrupting time is thereby shortened.

The state shown in FIG. 4 described above maintains that part of the pins 13 which is engaged within the separating optical connector 11B even if the switching work os the optical connectors is advanced to the midway. Thus, the optical connecting state is still maintained by both the optical connectors 11A, 11B at the existing ray line.

In the following pin forward moving step, the part of the pins 13 remaining in the engaging holes 12 of the separating optical connector 11B is removed to suppress the irregularity of removing the pins 13 to the minimum limit.

Therefore, the switching works of the connection units are simultaneously executed from the state in FIG. 4 to shorten the above-mentioned signal interrupting time.

Figure 5:
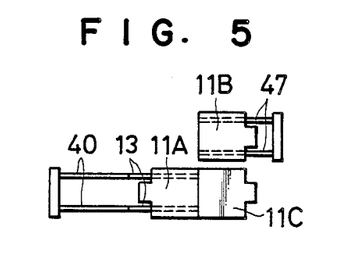

Still another one of the other embodiments executes the following connector switching step while keeping the pushing rods 47 inserted into the engaging holes 12 of the separating optical connector 11B as shown in FIG. 5 in the pin moving step of FIGS. 2(a) to 2(b), and carrying out the connector switching step.

More specifically, when moving to the next connector switching step after the pushing rods 47 are removed from the engaging holes 12 of the separating optical connector 11B, the start of the next step is delayed during the time of removing the pushing rods 47, but, as shown in FIG. 5, when the next step is started while keeping the pushing rods 47 in the engaging holes 12 of the separating optical connector 11B, the switching work is rapidly completed.

The embodiment in FIG. 5 may be applied to the case of FIG. 3.

Figure 6:
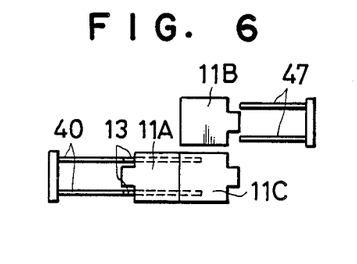

The last one of the other embodiments includes the steps of temporarily stopping the movement of the pins as shown in FIG. 6 at the midway point of engaging part of the pins 13 of the reconnecting optical connector 11A side within the engaging holes 12 of the switching optical connector 11C in the pin backward moving step of FIG. 2(d), measuring the connecting loss by the reconnecting optical connector 11A and the switching optical connector 11C during the stopping time, continuing the pin backward moving step when the connecting loss is smaller than the allowable value, and recovering the connection with the reconnecting optical connector 11A and the separating optical connector 12B when the connecting loss exceeds the allowable value.

The reason for this is to advance the completion of the recovering work when the connecting loss after the optical connector is switched is large.

Figure 7:
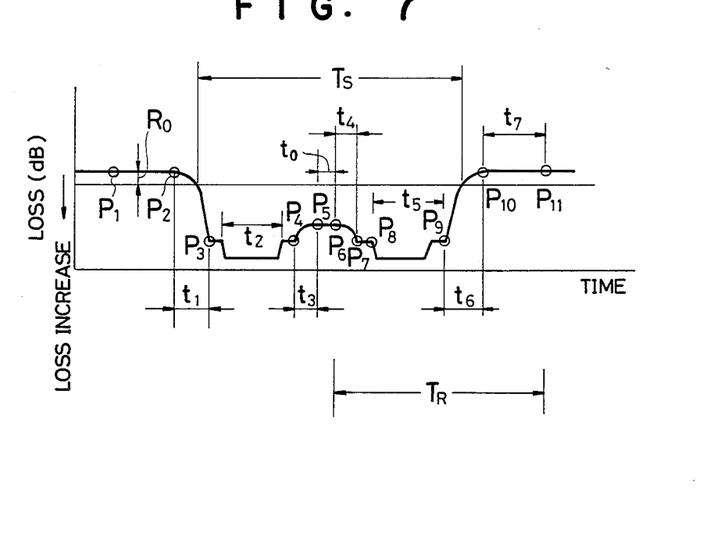
FIG. 7 is a characteristic diagram showing the loss of an example of switching an optical connector according to the invention.

In other words, the transmission loss characteristic of the optical connector switching example when employing the embodiment in FIG. 6 is as shown in FIG. 7.

In FIG. 7, $P_1$ and $P_2$ designate starting and finishing points when the front halves of the pins 13 are removed from the engaging holes 12 of the separating optical connector 11B in the pin forward moving step, $P_2$ to $P_3$ designate starting and finishing times when the rear halves of the pins 13 are removed similarly from the engaging holes 12 of the separating optical connector 11B, $t_1$ designates the consuming time of $P_2$ and $P_3$, $t_2$ designates the consuming time of the connector switching step, $P_4$ and $P_5$ designate starting and finishing times when engaging the rear halves of the pins 13 in the engaging holes 12 of the switching optical connector 11C, $t_3$ designates consuming times of $P_4$ to $P_5$, $t_0$ designates the temporary stopping time of the pins 13 in the pin backward moving step, $P_6$ and $P_7$ designate starting and finishing times when the rear halves of the pins 13 are removed from the engaging holes 12 of the switching optical connector 11C in the pin removing step in the recovering work, $t_4$ designates the consuming time of $P_6$ to $P_7$, $P_8$ and $P_9$ designate starting and finishing times of backwardly moving the reconnecting optical connector 11A in the recovery work, $t_5$ designates the consuming time of $P_8$ to $P_9$, $P_9$ and $P_{10}$ designate the starting and finishing time when engaging the rear halves of the pins 13 with the engaging holes 12 of the separating optical connector 11B in the recovery work, $t_6$ designates the consuming time of $P_8$ and $P_9$, $P_{10}$ and $P_{11}$ designate the starting and finishing times when engaging the rear halves of the pins 13 with the engaging holes 12 of the separating optical connector 11B, $T_S$ designates the interrupting time of the optical signal, and $T_R$ designates a recovery working time.

The connecting loss of the reconnecting optical connector 11A and the switching optical connector 11C is measured at the temporary stopping time $t_0$ in the above operation, and when the connecting loss is lower than the allowable value, the pin backward moving step is continued, while when the connecting loss exceeds the allowable value, the connection of the reconnecting optical connector 11A and the separating optical connector 11C is recovered.

In the embodiments described above, predetermined switching work can be executed by fixing arbitrary ones of the reconnecting optical connector 11A, the separating optical connector 11C in relative relation and upon moving the other. Thus, the reconnecting optical connector 11A may be fixed and the separating optical connector 11B and the switching optical connector 11C may be moved contrary to the above operation.

The moving operations of the pins 13 will be naturally varied in respect of this.

Figure 8:
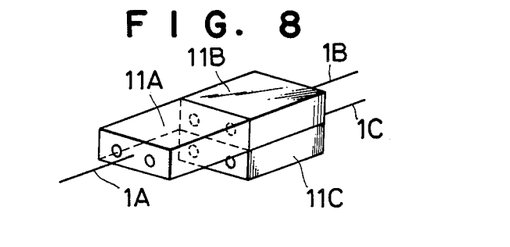
FIG. 8 is an explanatory view schematically showing embodiments except the above embodiments of a method for switching an optical connector of the invention.

In the embodiments described above, the switching optical connector 11C has been disposed at the side of the separating optical connector 11B when switching the optical connector. However, the switching optical connector 11C may be disposed under (or above) the separating optical connector 11B as shown in FIG. 8. In this case, the above-mentioned operations are all effective.

Further, when switching the optical connector attached to the single-core optical transmission unit, the above-mentioned method is also effective.

Figure 9:
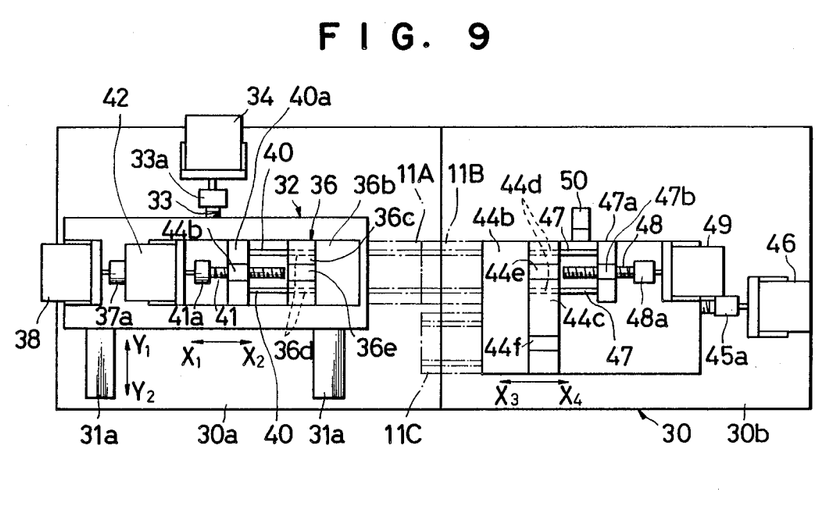
FIG. 9 is a plan view showing an embodiment of an apparatus for switching an optical connector according to the present invention.
Figure 10:
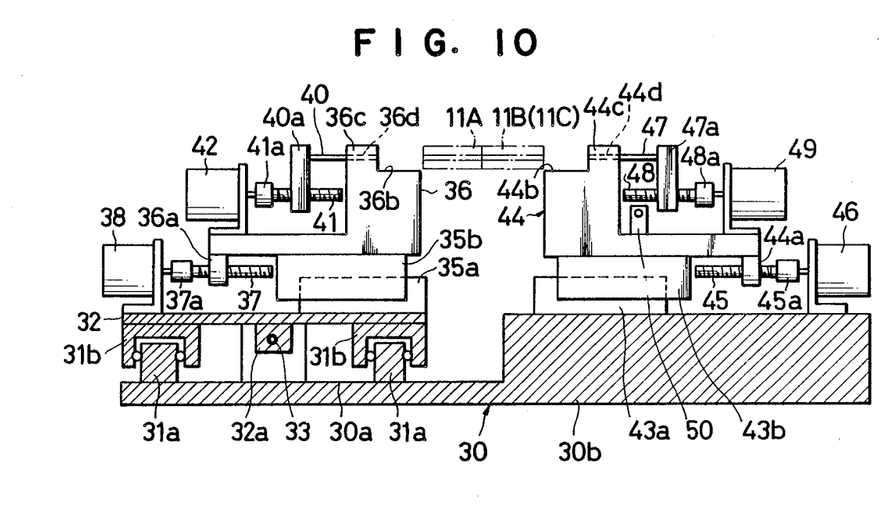
FIG. 10 is a front view of the apparatus.

FIGS. 9 and 10 show an embodiment of an apparatus for switching an optical connector according to this invention.

The apparatus of this invention in FIGS. 9 and 10 is disposed ordinarily in the connecting portions at both ends of a zone to be switched of the ray line which is to be used to switch the optical connector of the connecting portions.

In FIGS. 9 and 10, a base 30 has a rectangular flat shape, the upper surface of the base 30 has high and low steps in such a manner that one side's upper surface becomes a low surface 30a and the other side's upper surface becomes a high surface 30b.

A pair of guide rails 31a disposed in parallel are laid along the $Y_1$-$Y_2$ direction in FIG. 9 on the low surface 30a of the base 30, sliders 31b are slidably engaged with the guide rails, 31a, a movable base 32 is installed over the sliders 31b so that the base 32 is movable in the $Y_1$-$Y_2$ direction.

The level of the base 32 is the same as the high surface 30b of the base 30.

A block 32a having a threaded hole in the axial center is fixed along the $Y_1$-$Y_2$ direction at the center on the lower surface of the base 32.

A drive shaft 33 is engaged with the threaded hole of the block 32a, and the drive shaft 33 is connected to the output shaft of a drive motor (stepping motor) through a coupling 33a.

Thus, the base 32 moves in the $Y_1$-$Y_2$ direction by a normal or reverse rotation of the drive motor 34.

Guide rails 35a are laid along the $X_1$-$X_2$ direction of FIG. 9 on the upper surface of the base 32, sliders 35b are slidably engaged with the guide rails 35a, a main base 38 is attached to the sliders 35b so that the base 38 is movable in the $X_1$-$X_2$ direction.

A block piece 36a having a threaded hole in the $X_1$-$X_2$ direction is fixed to the axial center at the center on the lower surface of the rear end ($X_1$ side of FIG. 9) of the base 36.

A drive shaft 37 is engaged with the threaded hole of the block piece 36a, and the drive shaft 37 is connected through a coupling 37a to the output shaft of a drive motor (stepping motor) 38.

Thus, the base 36 moves in the $X_1$-$X_2$ direction by the normal or reverse rotation of the drive motor 38 on the base 32.

An L-shaped holer 36b is formed at the upper surface of the front end of the base 38 (at the side of $X_2$ in FIG. 9), and formed in a size adapted with the optical connector 11A.

The vertical wall 38c which forms part of the holder 36b of the base 38 is perforated with two through holes 36d disposed in parallel longitudinally through the vertical wall 36c, and a groove 36c for engaging coated optical transmission unit 1A is formed on the upper surface of the vertical wall 36c.

The through holes 36d correspond to the pin pushing rods 40 described with respect to the above-mentioned method to be relatively engaged with each other.

A pair of pin pushing rods 40 inserted from the rear end face side of the vertical wall 36c are attached with holders 40a at the base ends thereof.

A groove 40b is formed on the upper surface of the holder 40a for engaging the coated optical transmission unit 1A.

A drive shaft 41 having a threaded hole parallel to the pin pushing rod 40 is engaged with the center on the lower end of the holder 40a, and connected through a coupling 41a to the output shaft of a drive motor (stepping motor) 42, which is disposed at the rear end side on the base 38.

Thus, the pin pushing rod 40 is telescopically forward or backward in the $X_1$-$X_2$ direction in the through hole 38d and the engaging hole 12 of the optical connector 11A by the normal or reverse rotation of the drive motor 42.

Guide rails 43a are laid along $X_3$-$X_4$ in FIG. 9 on the high surface 30b of the base 30. Sliders 43b are slidably engaged with the guide rails 43a. A subbase 44 is fixed to the sliders 43b, and is movable in the $X_3$-$X_4$ direction.

A block piece 44a having a threaded hole in the $X_3$-$X_4$ direction in the axial center is fixed to the center on the lower surface of the rear end (at the $X_4$ side of FIG. 9) on the subbase 44.

A drive shaft 45 is engaged with the threaded hole of the block piece 44a, and connected through a coupling 45a to the output shaft of a drive motor (stepping motor).

The subbase 44 is moved forward or backward in the $X_3$–$X_4$ direction by the normal or reverse rotation of a drive motor 48.

An inverted L-shaped holder 44b is formed on the upper surface at the front end of the subbase 44 (at the side of $X_6$ in FIG. 9), and is formed in a size adapted to the optical connectors 11B, 11C aligned in parallel.

Two parallel through holes 44d penetrating longitudinally through the vertical wall 44c for forming part of the holder 44b are opened at the subbase 44, and grooves 44a, 44f are formed on the upper surface of the vertical wall 44c for engaging the coated optical transmission units 1B, 1C.

The through holes 44d correspond relatively to the pin pushing rods 47 described with respect to the method of the invention, and are aligned linearly with the through holes 36d.

A pair of pin pushing rods 47 inserted from the rear end face sides of the vertical wall 44c into the through holes 44d are attached at the base ends thereof with holders 47a.

A drive shaft 48 having a threaded hole parallel to the pin pushing rods 47 is engaged with the center on the lower end of the holder 47a, connected through a coupling 48a to the output shaft of a drive motor (stepping motor) 49, which is mounted at the rear end side on the subbase 44.

Thus, the pin pushing rods 47 are telescopically movable forward and backward in the $X_1$–$X_2$ direction in the through hole 44d and the pin engaging holes 12 of the optical connector 11B.

A position detecting sensor 50 is mounted on the subbase 44 to move together with the subbase 44. The position detecting sensor 50 detects the moving position of the pin pushing rods 47.

More specifically, the position detecting sensor 50 is connected to the input side of a controller, not shown, and when the pin pushing rods 47 move forward to a predetermined position, a predetermined signal is supplied to the controller.

The drive motors 34, 42, 46, 49 are electrically connected to the output side of the controller, which outputs a drive signal to the drive motors.

When the above-mentioned method is executed by the switching apparatus shown in FIGS. 9 and 10, the reconnecting optical connector 11A and the separating optical connector 11B connected to each other are set over the holder 38b of the main base 36 and the holder 44b of the subbase 44, and the switching optical connector 11C is set in parallel with the separating optical connector 11B.

Then, the pin pushing rods 40, 47 and the main base 36 and the subbase 44 for holding the reconnecting optical connector 11A, the separating optical connector 11B and the switching optical connector 11C are moved at suitable predetermined distances in the $Y_1$–$Y_2$ directions through a predetermined drive system and guide means in order to switch the optical connectors described with respect to FIGS. 2 to 6.

In this case, the controller for holding the position detecting sensor 50 suitably controls the movement and the stoppage of the pin pushing rods 40, 47, the main base 38 and the subbase 44.

In the switching apparatus in FIGS. 9 and 10, when the optical connectors are switched as shown in FIG. 8, a combination construction of the pin pushing rods 40, 47, the main base 38 and the subbase 44 are correspondingly altered in design, and the moving means and the guiding means are similarly altered in design.

In the switching apparatus in FIG. 9 and 10, an arbitrary actuator is employed as means for moving the pin pushing rods 40, 47, and a mechanism utilizing a spring or a solenoid may be, for example, employed in addition to the drive motor (stepping motor) as shown.

Further, the method and the apparatus of this invention may switch the optical connectors in one zone or a plurality of zones at the existing ray line.

According to the method of this invention, the optical connectors are replaced momentarily by less and simple steps without wasting any work, such as having a connector disposing step, pin forward moving step, connector switching step and a pin backward moving step without depending upon the worker's skill. Thus, optical signal interrupting time by the switching can be extremely shortened.

According to the apparatus of this invention, the main base, the subbase, the operating means of the pin pushing rods, relative moving means of the main base, and the subbase are functionally associated. Thus, the steps of the above-mentioned optical connector switching method can be mechanically automated to establish the automation of the method for switching the optical connector.

What is claimed is:

1. A method for switching an optical connector having paired optical connectors opposed at front end faces thereof, pins engaged with engaging holes penetrating linearly longitudinally at the optical connectors to connect both the optical connectors to each other in such a manner that one of both the optical connectors in a connected state is for reconnecting and the other is for separating so that the reconnecting optical connector is connected to a switching optical connector having an engaging hole prepared separately, comprising:

connector disposing step of disposing the switching optical connector in parallel with the separating optical connector, pin forward moving step of moving the pins engaged with both the reconnecting and separating optical connectors each other to the reconnecting optical connector side by means of a pushing rod inserted from the rear end face of the separating optical connector into the engaging hole in order to remove the pins from the separating optical connector, connecting switching step of relatively moving the reconnecting optical connector, the separating optical connector and the switching optical connector along the front end faces thereof to separate the separating optical connector from the reconnecting optical connector and simultaneously bringing the front end face of the reconnecting optical connected and the front end face of the switching optical connector in coincidence with each other, and pin backward moving step of moving the pins of the reconnecting optical connector side to the switching optical connector side by means of a pushing rod disposed at the rear end face side of the reconnecting optical connector to engage the pins with the engaging holes of the switching optical connector to dispose the pins over the reconnecting optical connector and the separating optical connector.

2. The method according to claim 1, wherein said connector disposing step is preceded in relative relationship by the connector disposing step and followed by the pin forward moving step.

3. The method according to claim 1, wherein before starting the connector switching step, the reconnecting optical connector and the separating optical connector are relatively moved at a distance in a direction for separating the front end faces of the connectors to set a small gap between the front end faces of the connectors, and the reconnecting optical connector and the switching optical connector are relatively moved in a direction for opposing the front end faces of the connectors in the following connector switching step.

4. The method according to claim 1, wherein before removing the pins from the separating optical connector in the pin forward moving step, the pins are temporarily stopped, the pins are thereafter again moved to remove the pins from the separating optical connector.

5. The method according to claim 1, wherein the pin pushing rods inserted into the engaging holes of the separating optical connector remain in the engaging holes in the pin forward moving step, and the following connector switching step is executed.

6. The method according to claim 1, wherein when part of the pins at the reconnecting optical fiber side is engaged within the engaging holes of the switching optical connector in the pin backward moving step, the pins are temporarily stopped on the way, connecting loss by the reconnecting optical connector and the switching optical connector is measured, the pin backward moving step is continued when the connecting loss is an allowable value or lower, and the connection of the reconnecting optical connector and the separating optical connector is recovered when the connecting loss exceeds the allowable value.

7. An apparatus for switching an optical connector having paired optical connectors opposed at front end faces thereof, pins engaged with engaging holes penetrating linearly longitudinally at the optical connectors to connect both the optical connectors to each other, comprising:
- a reconnecting optical connector configured from one of said paired optical connectors and being operable for reconnecting with a switching optical connector having an engaging hole prepared separately,
- a separating optical connector configured from the other of said paired optical connectors and being operable for separating from said reconnecting optical connector so that said reconnecting optical connector is able to reconnect with said switching optical connector,
- a main base for holding the reconnecting optical connector, and
- a sub-base for holding the separating optical connector and the switching optical connector in parallel;
- said main base and subbases being disposed relatively movably in such a manner that the front end faces thereof are opposed to each other, the pin pushing rods engaged within the engaging holes of the optical connectors and pushing rod operating means provided on the main and sub bases, and wherein at least one of the main and subbases has moving means for relatively moving the main or subbase in a desired direction.

8. The apparatus according to claim 7, wherein at least one of said main base and said subbase comprises first moving means for relatively moving to oppose the front end faces of said main base and said subbase, and second moving means for relatively moving longitudinally said main base and said subbase.

* * * * *

UNITED STATES PATENT AND TRADEMARK OFFICE
CERTIFICATE OF CORRECTION

PATENT NO. : 4,909,590                                               Page 1 of 2

DATED : March 20, 1990

INVENTOR(S) : Kazuo Kamiko et al.

It is certified that error appears in the above-identified patent and that said Letters Patent is hereby corrected as shown below:

ON THE TITLE PAGE:

Column 7 and 8 should be added as per attached sheets.

Signed and Sealed this

Twenty-third Day of June, 1992

*Attest:*

DOUGLAS B. COMER

*Attesting Officer*          *Acting Commissioner of Patents and Trademarks* engaging holes 12 of the switching optical connector 11C, t₃ designates consuming times of P₄ to P₅, t₀ designates the temporary stopping time of the pins 13 in the pin backward moving step, P₆ and P₇ designate starting and finishing times when the rear halves of the pins 13 are removed from the engaging holes 12 of the switching optical connector 11C in the pin removing step in the recovering work, t₄ designates the consuming time of P₆ to P₇, P₈ and P₉ designate starting and finishing times of backwardly moving the reconnecting optical connector 11A in the recovery work, t₅ designates the consuming time of P₈ to P₉, P₉ and P₁₀ designate the starting and finishing time when engaging the rear halves of the pins 13 with the engaging holes 12 of the separating optical connector 11B in the recovery work, t₆ designates the consuming time of P₈ and P₉, P₁₀ and P₁₁ designate the starting and finishing times when engaging the rear halves of the pins 13 with the engaging holes 12 of the separating optical connector 11B, $T_S$ designates the interrupting time of the optical signal, and $T_R$ designates a recovery working time.

The connecting loss of the reconnecting optical connector 11A and the switching optical connector 11C is measured at the temporary stopping time t₀ in the above operation, and when the connecting loss is lower than the allowable value, the pin backward moving step is continued, while when the connecting loss exceeds the allowable value, the connection of the reconnecting optical connector 11A and the separating optical connector 11C is recovered.

In the embodiments described above, predetermined switching work can be executed by fixing arbitrary ones of the reconnecting optical connector 11A, the separating optical connector 11C in relative relation and upon moving the other. Thus, the reconnecting optical connector 11A may be fixed and the separating optical connector 11B and the switching optical connector 11C may be moved contrary to the above operation.

The moving operations of the pins 13 will be naturally varied in respect of this.

In the embodiments described above, the switching optical connector 11C has been disposed at the side of the separating optical connector 11B when switching the optical connector. However, the switching optical connector 11C may be disposed under (or above) the separating optical connector 11B as shown in FIG. 8. In this case, the above-mentioned operations are all effective.

Further, when switching the optical connector attached to the single-core optical transmission unit, the above-mentioned method is also effective.

FIGS. 9 and 10 show an embodiment of an apparatus for switching an optical connector according to this invention.

The apparatus of this invention in FIGS. 9 and 10 is disposed ordinarily in the connecting portions at both ends of a zone to be switched of the ray line which is to be used to switch the optical connector of the connecting portions.

In FIGS. 9 and 10, a base 30 has a rectangular flat shape, the upper surface of the base 30 has high and low steps in such a manner that one side's upper surface becomes a low surface 30a and the other side's upper surface becomes a high surface 30b.

A pair of guide rails 31a disposed in parallel are laid along the $Y_1-Y_2$ direction in FIG. 9 on the low surface 30a of the base 30, sliders 31b are slidably engaged with the guide rails, 31a a movable base 32 is installed over the sliders 31b so that the base 32 is movable in the $Y_1-Y_2$ direction.

The level of the base 32 is the same as the high surface 30b of the base 30.

A block 32a having a threaded hole in the axial center is fixed along the $Y_1-Y_2$ direction at the center on the lower surface of the base 32.

A drive shaft 33 is engaged with the threaded hole of the block 32a, and the drive shaft 33 is connected to the output shaft of a drive motor (stepping motor) through a coupling 33a.

Thus, the base 32 moves in the $Y_1-Y_2$ direction by a normal or reverse rotation of the drive motor 34.

Guide rails 35a are laid along the $X_1-X_2$ direction of FIG. 9 on the upper surface of the base 32, sliders 35b are slidably engaged with the guide rails 35a, a main base 38 is attached to the sliders 35b so that the base 38 is movable in the $X_1-X_2$ direction.

A block piece 36a having a threaded hole in the $X_1-X_2$ direction is fixed to the axial center at the center on the lower surface of the rear end ($X_1$ side of FIG. 9) of the base 36.

A drive shaft 37 is engaged with the threaded hole of the block piece 36a, and the drive shaft 37 is connected through a coupling 37a to the output shaft of a drive motor (stepping motor) 38.

Thus, the base 36 moves in the $X_1-X_2$ direction by the normal or reverse rotation of the drive motor 38 on the base 32.

An L-shaped holer 36b is formed at the upper surface of the front end of the base 38 (at the side of $X_2$ in FIG. 9), and formed in a size adapted with the optical connector 11A.

The vertical wall 38c which forms part of the holder 36b of the base 38 is perforated with two through holes 36d disposed in parallel longitudinally through the vertical wall 36c, and a groove 36c for engaging coated optical transmission unit 1A is formed on the upper surface of the vertical wall 36c.

The through holes 36d correspond to the pin pushing rods 40 described with respect to the above-mentioned method to be relatively engaged with each other.

A pair of pin pushing rods 40 inserted from the rear end face side of the vertical wall 36c are attached with holders 40a at the base ends thereof.

A groove 40b is formed on the upper surface of the holder 40a for engaging the coated optical transmission unit 1A.

A drive shaft 41 having a threaded hole parallel to the pin pushing rod 40 is engaged with the center on the lower end of the holder 40a, and connected through a coupling 41a to the output shaft of a drive motor (stepping motor) 42, which is disposed at the rear end side on the base 38.

Thus, the pin pushing rod 40 is telescopically forward or backward in the $X_1-X_2$ direction in the through hole 38d and the engaging hole 12 of the optical connector 11A by the normal or reverse rotation of the drive motor 42.

Guide rails 43a are laid along $X_3-X_4$ in FIG. 9 on the high surface 30b of the base 30. Sliders 43b are slidably engaged with the guide rails 43a. A subbase 44 is fixed to the sliders 43b, and is movable in the $X_3-X_4$ direction.

A block piece 44a having a threaded hole in the $X_3-X_4$ direction in the axial center is fixed to the center on the lower surface of the rear end (at the $X_4$ side of FIG. 9) on the subbase 44.